Patented June 25, 1929.

1,718,821

UNITED STATES PATENT OFFICE.

EDWARD F. HERSCHEDE, OF CINCINNATI, OHIO.

WRIST-STRAP STRUCTURE.

Application filed May 26, 1926. Serial No. 111,864.

This invention relates to securing means for wrist straps for use with wrist watches and the like, and has for an object the provision of a simple and inexpensive adjustable securing means.

Another object is to provide a structure of the class referred to which is simple and inexpensive to manufacture.

Another object is to provide a device of this kind wherein the adjustment of the securing means is simple, efficient, and easy to manipulate.

These and other objects are attained by the means described herein and disclosed in the accompanying drawings, in which Fig. 1 is a perspective view of a wrist watch and straps having embodied therein a device of my invention.

Figure 1:
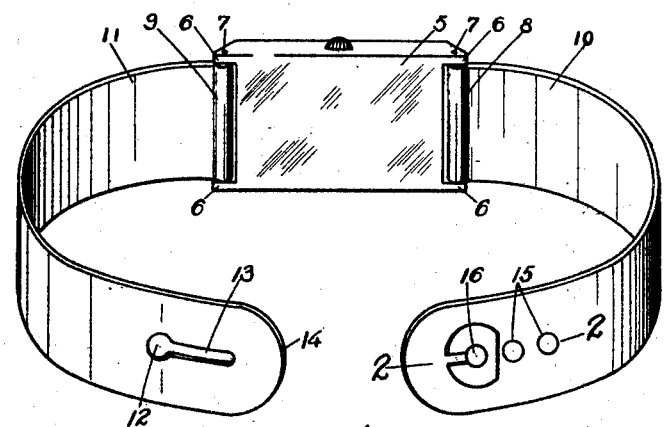

A wrist watch 5 is provided at its opposite ends with pairs of spaced lugs 6, between which extend pins 7 which pass through loop portions 8 and 9 formed on the ends of strap members 10 and 11, respectively. The strap member 11 has a perforation 12 and a communicating elongated aperture 13 terminating at a distance from the end 14 of strap member 11. The strap member 10 is provided with a series of spaced perforations 15 which are aligned with the elongated aperture 13 in strap member 11. A stud indicated generally as 16 is adapted to be inserted in any of the perforations 15 and to be locked therein by a locking plate hereinafter described.

Figure 2:
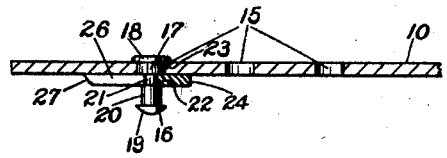
Fig. 2 is a cross sectional view on line 2—2 of Fig. 1.
Figure 3:
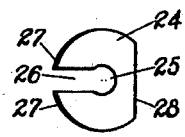
Fig. 3 is a plan view of a plate forming a detail of my invention.
Figure 4:
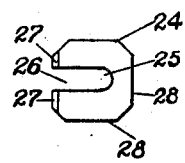
Fig. 4 is a similar view showng a modfied form of the plate.

Referring to Fig. 2 the stud 16 comprises a short cylindrical section 17 of a length substantially equal to the thickness of strap member 10. A thin beveled or rounded flange 18 is adapted to abut the inner face of strap member 10 to preclude movement of the stud entirely through the perforations 15. The opposite end of the stud carries a flanged head 19 of such diameter as to permit it to be passed through the perforation 15. The shank 20, which carries the head 19, is of a diameter slightly less than the width of elongated aperture 13, while the head 19 is of such diameter as to permit it to be passed through perforation 12 in strap member 11. The shank 20 has a reduced portion 21 adjacent the section 17 whereby to provide a shoulder 22 on the shank and a shoulder 23 on stud section 17. A locking plate 24 may be of any suitable shape, and comprises a thin resilient washer having a perforation 25 therein which communicates with one edge of the washer by a slightly reduced slot 26. The locking plate 24 is of a thickness substantially equal to the distance between shoulders 22 and 23 on the stud 16 and is adapted to be snugly received therebetween. The perforation 25 in the plate is of a diameter such that the reduced portion 21 of stud 16 will snugly fit therein. In order to interlock the parts as shown in Fig. 2 the tapered edges of the locking plate 24 are positioned on opposite sides of the reduced portion 21 of the stud 16 and the locking plate is then forced toward the stud, the resiliency of the locking plate permitting sufficient spreading thereof to permit passage of the reduced portion 21 through slot 26 and into the perforation 25 communicating therewith. As soon as the reduced portion 21 enters perforation 25 the tension on the locking plate is relieved, whereupon the normal resiliency of the locking plate precludes accidental separation of the parts.

As heretofore stated, the shape of the locking plate 24 may take any desired form and should be of a diameter such that it may assume any position about the stud 16 without projecting beyond the body lines of the strap member 10. It is advantageous to provide one or more flattened edges 28 on the locking plate in order to facilitate mounting and removal of the plate on and off of the stud. This may be accomplished by using any suitable implement, such as a coin, which facilitates exerting and directing suitable pressure to force the locking plate onto and off of the stud.

The operation of the device is readily apparent. The strap members may be of any suitable material, while the stud and locking plate are preferably formed of metal. The thin rounded or flattened flange 18 projects for such a slight distance beyond the inner wall of the strap member 10 as to afford no discomfort to a wearer.

What I claim is:

1. In a device of the class described, the combination of a perforate strap member, a stud adapted to be passed through a perforation in the strap, a flange on one end of said stud and having a diameter greater than the the perforations in the strap, the opposite end of the stud being developed into a headed shank, a reduced portion on the shank intermediate the head and flange and disposed beyond the body of the strap for providing a pair of opposed shoulders, one of said shoulders being disposed in a plane with one face of the strap, a resilient locking plate having a perforation therein of a diameter substantially equal to the reduced portion of the shank and having a reduced slot communicating with one edge of the locking plate, the resiliency of the locking plate permitting spreading thereof, whereby the reduced portion of the shank may be passed through the restricted slot therein and into the perforation for positioning the locking plate in abutment with the opposed shoulders of the stud whereby the stud and strap are secured against separation.

2. In a wrist strap member the combination of a strap having spaced perforations therein, a stud having a flange at one end thereof for abutment with one side of the strap member, a cylindrical section extending from the flange and adapted to seat in and fill a perforation in the strap with the remainder of the body of the stud projecting from the opposite side of the strap, said projecting portion having an annular groove for providing a pair of opposed shoulders on the stud exteriorly of the strap, one of said shoulders being disposed in a plane with the last mentioned side of the strap, a slotted locking plate seating in the groove in the stud and retained against longitudinal movement by the shoulders, the strap being secured between the flange and one face of said locking plate, and a head on the free end of the stud, said head and the locking plate serving to receive between them a second slotted strap.

3. In combination a stud having a head and a flange at its opposite ends, said stud being adapted for mounting in a perforate strap and having an annular groove spaced from the head and flange whereby to provide a pair of opposed shoulders, and a slotted locking plate received in the groove and retained against movement longitudinally of the stem by said shoulders and serving to fixedly position the stud on the perforate strap.

4. In a device of the class described the combination of a perforate strap member, a stud extending through the perforation in the strap, a flange on one end of the stud and abutting one side of the strap, the opposite end of the stud being developed into a headed shank, said shank having an annular groove therein providing a pair of opposed shoulders, a plate having a slot therein adapted to seat in the annular groove and to be retained against longitudinal movement by said shoulders, said plate serving to bind the strap against the flange.

5. In a device of the class described the combination of a perforate strap, a flanged stud extending through the perforation in the strap and having an annular groove intermediate its ends whereby to provide a pair of opposed shoulders, a slotted plate seated in the groove and retained against longitudinal movement on the stud by said shoulders and serving to retain the strap in abutment with the flange.

6. An adjustable stud for wrist straps and the like comprising a flanged stud adapted to be passed through a strap, said stud having an annular groove intermediate its ends providing a pair of opposed shoulders and a locking plate insertable in said groove and retained against longitudinal displacement by said shoulders, said plate and flange on the stud serving to bind a strap between them.

7. In a device of the class described the combination of a perforate strap, a flanged stud having an annular groove intermediate its ends, the stud extending through a perforation in the strap with the flange in abutment with one side of the strap, said groove providing a pair of opposed shoulders, and a locking plate slidably mounted in the groove and fixed against longitudinal movement by said shoulders, said plate serving to bind the strap between the flange and the plate.

In testimony whereof, I have hereunto subscribed my name this 22nd day of May, 1926.

EDWARD F. HERSCHEDE.